United States Patent
Kong et al.

(10) Patent No.: US 7,142,601 B2
(45) Date of Patent: Nov. 28, 2006

(54) TRANSCODING COMPRESSED VIDEOS TO REDUCING RESOLUTION VIDEOS

(75) Inventors: Hao-Song Kong, Auburndale, MA (US); Anthony Vetro, Cambridge, MA (US); Huifang Sun, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 601 days.

(21) Appl. No.: 10/413,250

(22) Filed: Apr. 14, 2003

(65) Prior Publication Data
US 2004/0202250 A1    Oct. 14, 2004

(51) Int. Cl.
*H04B 1/66* (2006.01)
*H04N 7/12* (2006.01)

(52) U.S. Cl. .................................. 375/240.16

(58) Field of Classification Search ........... 375/240.16, 375/240.15, 240.13, 240.12, 240.11, 240.24, 375/240.03; 348/390.1; 382/232; *H04B 7/66, H04B 1/66; H04N 7/12*
See application file for complete search history.

(56) References Cited

U.S. PATENT DOCUMENTS

| | | | |
|---|---|---|---|
| 6,037,987 A | 3/2000 | Sethuraman | 348/415 |
| 6,192,081 B1 | 2/2001 | Chiang et al. | 375/240 |
| 6,345,279 B1 | 2/2002 | Li et al. | 707/104 |
| 6,483,851 B1 | 11/2002 | Neogi | 370/466 |
| 6,490,320 B1 | 12/2002 | Vetro et al. | 375/240.08 |
| 6,647,061 B1 * | 11/2003 | Panusopone et al. | 375/240.12 |
| 6,671,322 B1 * | 12/2003 | Vetro et al. | 375/240.16 |
| 6,870,886 B1 * | 3/2005 | Challapali et al. | 375/240.24 |
| 6,934,334 B1 * | 8/2005 | Yamaguchi et al. | 375/240.16 |
| 2002/0067768 A1 * | 6/2002 | Hurst | 375/240.03 |
| 2002/0126752 A1 * | 9/2002 | Kim | 375/240.03 |
| 2003/0174770 A1 * | 9/2003 | Kato et al. | 375/240.2 |
| 2003/0227974 A1 * | 12/2003 | Nakamura et al. | 375/240.25 |

OTHER PUBLICATIONS

Xin, et al., "An HDTV-to-SDTV spatial transcoder," IEEE Transactions on Circuits and Systems for Video Technology, vol. 12, No. 11, Nov. 2002,.
Shen, et al., "Transcoder with arbitrarily resizing capability," IEEE proc. ISCAS 2001.

* cited by examiner

*Primary Examiner*—Tung Vo
(74) *Attorney, Agent, or Firm*—Dirk Brinkman; Clifton D. Mueller; Gene V. Vinokur

(57) ABSTRACT

A method and system transcodes an input video to a lower spatial resolution. The input video is first decoded into pictures. Each picture includes a set of macroblocks. Each picture sub-sampled to a downscaled picture having a lower spatial resolution. A quantization scale is selected for each macroblock in the downscaled picture. A set of motion vectors is generated for each macroblock in the downscaled picture. A multiplier value based on the quantization scale is determined for each macroblock in the downscaled picture. One of a plurality of encoding modes is selected for each macroblock in the downscaled picture according to the quantization scale, the motion vectors, and the multiplier value. Then, each macroblock in each downscaled picture is encoded according to the quantization scale, the selected encoding mode, and the set of motion vectors to produce an output video having a lower spatial resolution that the input video.

11 Claims, 5 Drawing Sheets

TRANSCODING COMPRESSED VIDEOS TO REDUCING RESOLUTION VIDEOS

FIELD OF THE INVENTION

The invention relates generally to video transcoding, and more particularly to transcoding compressed videos from a higher spatial resolution to a lower spatial resolution.

BACKGROUND OF THE INVENTION

Video transcoding converts video bit streams from one coding format to other formats. The transcoding can consider syntax, bit rate, and resolution conversions. Transcoders can be used at the source or destination of videos, or in between, e.g., in video servers, network routers, and video receivers. Transcoders enable the delivery of videos to a variety of devices having different network connections or display capabilities, see U.S. Pat. No. 6,483,851, "System for network transcoding of multimedia data flow," issued to Neogi on Nov. 19, 2002, U.S. Pat. No. 6,490,320, "Adaptable bitstream video delivery system," issued to Vetro, et al. on Dec. 3, 2002, and U.S. Pat. No. 6,345,279, "Methods and apparatus for adapting multimedia content for client devices," issued to Li, et al. on Feb. 5, 2002.

The above patents focus on higher-level system design issues. However, detailed information describing the transcoding of video is not provided. In particular, those patents do not disclose how quantization parameters and conversion modes for macroblocks are determined.

Recently, there is an increased demand for video transcoding with spatial resolution reduction. Such requirements come from high-definition TV (HDTV) broadcasting and DVD applications, etc. In order to display HDTV programs on standard definition TV (SDTV), or to record the HDTV on the DVD recorder, it is necessary to convert a high resolution HDTV video to a low resolution SDTV video. In addition, hand-held devices with small video displays and low bit rate wireless connections require video transcoding.

The reduction of spatial resolution has been described by Xin, et al., "An HDTV-to-SDTV spatial transcoder," IEEE Transactions on Circuits and Systems for Video Technology, Vol. 12, No. 11, November 2002, Yin, et al., "Drift compensation for reduced spatial resolution transcoding," IEEE Transactions on Circuits and Systems for Video Technology, Vol. 12, No. 11, November 2002, Shanableh, et al., "Heterogeneous video transcoding to lower spatio-temporal resolutions and different encoding formats," IEEE Transactions on Multimedia, Vol. 2, No. 2, June 2000, and Shen, et al., "Transcoder with arbitrarily resizing capability," IEEE proc. ISCAS 2001.

FIG. 1 shows the basic structure and operation of a typical prior art video transcoder 100. The transcoder 100 includes a decoder 110, a downscale filter 120, and an encoder 130 connected serially to each other module. A macroblock mapper 140 is connected between the decoder and the encoder. An input video bitstream 101, with bit rate R1, is decoded 110 into YUV video frames. The decoded frames are then spatially downscaled 120 to lower resolution YUV frames. Concurrently, motion vectors and coding modes are extracted from the input bitstream by the MB mapper 140. The encoder 130 uses the extracted macroblock information to encode the filtered YUV frames into an output video stream 102 with a lower bit rate R2 and lower spatial resolution.

At the macroblock level, a variety of modes can be used to encode a video, depending on the coding standard. For example, in order to support interlaced video sequences, the MPEG-2 standard has several different macroblock coding modes, including intra mode, no motion compensation (MC) mode, frame/field motion compensation inter mode, forward/backward/interpolate inter mode, and frame/field DCT mode. As an advantage, the multiple modes provide better coding efficiencies due to their inherent adaptability.

However, the prior art either focuses on motion vector re-sampling or motion re-estimation for spatial resolution reduction, without considering the best coding mode. For efficiency, the encoding modes for the output video stream are usually based on the coding modes for the input video stream, using majority-voting. The resulting modes are certainly sub-optimal. Other criteria for making mode decision have also been described, but those coding modes are limited to intra and inter decision, with similar disadvantages.

Systems and methods for optimally selecting a macroblock coding mode based on a quantization scale selected for the macroblock are described in U.S. Pat. No. 6,037,987, "Apparatus and method for selecting a rate and distortion based coding mode for a coding system," issued to Sethuraman on Mar. 14, 2000, U.S. Pat. No. 6,192,081, "Apparatus and method for selecting a coding mode in a block-based coding system," issued to Chiang, et al. on Feb. 20, 2001, and Sun, et al., "MPEG coding performance improvement by jointly optimizing coding mode decisions and rate control," IEEE Transactions on Circuits and Systems for Video Technology, Vol. 7, No. 3, June 1997.

FIG. 2 shows a typical prior art system and method 200 for jointly optimizing the coding mode and the quantizer. That system 200 basically uses a brute force, trial-and-error method. The system 200 includes a quantization selector 210, a mode selector 220, a MB predictor 230, a discrete cosine transform (DCT) 240, a quantizer 250, a variable length coder (VLC) 260, a cost function 270 to select an optimal quantization and mode 280. The optimal quantization and mode 280 are achieved by an iterative procedure for searching through a trellis to find a path that has a lowest cost. As the quantizer selector 210 changes its step size, e.g., 1 to 31, the mode selector 220 responds by selecting each mode for each macroblock, e.g., intra 221, no MC 222, MC frame 223, and MC field 224.

A macroblock level is predicted 230 in terms of a decoded picture type. Then, the forward DCT 240 is applied to each macroblock of a predictive residual signal to produce DCT coefficients. The DCT coefficients are quantized 250 with each step size in the quantization parameter set. The quantized DCT coefficients are entropy encoded using the VLC 260, and a bit rate 261 is recorded for later use. In parallel, a distortion calculation by means of mean-square-error (MSE) is performed over pixels in the macroblock resulting in a distortion value.

Next, the resulting bit rate 261 and distortion 251 are received into the rate-distortion module for cost evaluation 270. The rate-distortion function is constrained by a target frame budget imposed by a rate constraint $R_{picture}$ 271. The cost evaluation 270 is performed on each value q in the quantization parameter set. The quantization scale and coding mode for each macroblock with the lowest value are selected.

In the prior art system, if Q denotes the set of all admissible quantizers, and M denotes the set of all admissible coding modes, then the complexity of the prior art system is Q×M. Because a single loop for each quantizer value involves DCT transformation, quantization, distortion and bit count calculation for each macroblock, the double loop for joint mode decision and quantizer selection in the prior art makes the complexity extremely high.

Given the above prior art, there is a need to provide a new system and method for video transcoding with spatial resolution reduction, which achieves the optimal solution for coding mode decision and motion vector selection with less complexity.

SUMMARY OF THE INVENTION

A method and system transcodes an input video to a lower spatial resolution. The input video is first decoded into pictures. Each picture includes a set of macroblocks.

Each picture is sub-sampled to a downscaled picture having a lower spatial resolution. A quantization scale is selected for each macroblock in the downscaled picture.

A set of motion vectors is generated for each macroblock in the downscaled picture. A multiplier value based on the quantization scale is determined for each macroblock in the downscaled picture.

One of a plurality of encoding modes is selected for each macroblock in the downscaled picture according to the quantization scale, the motion vectors, and the multiplier value.

Then, each macroblock in each downscaled picture is encoded according to the quantization scale, the selected encoding mode, and the set of motion vectors to produce an output video having a lower spatial resolution than the input video.

DETAILED DESCRIPTION OF THE PREFERRED EMBODIMENT

Figure 1:
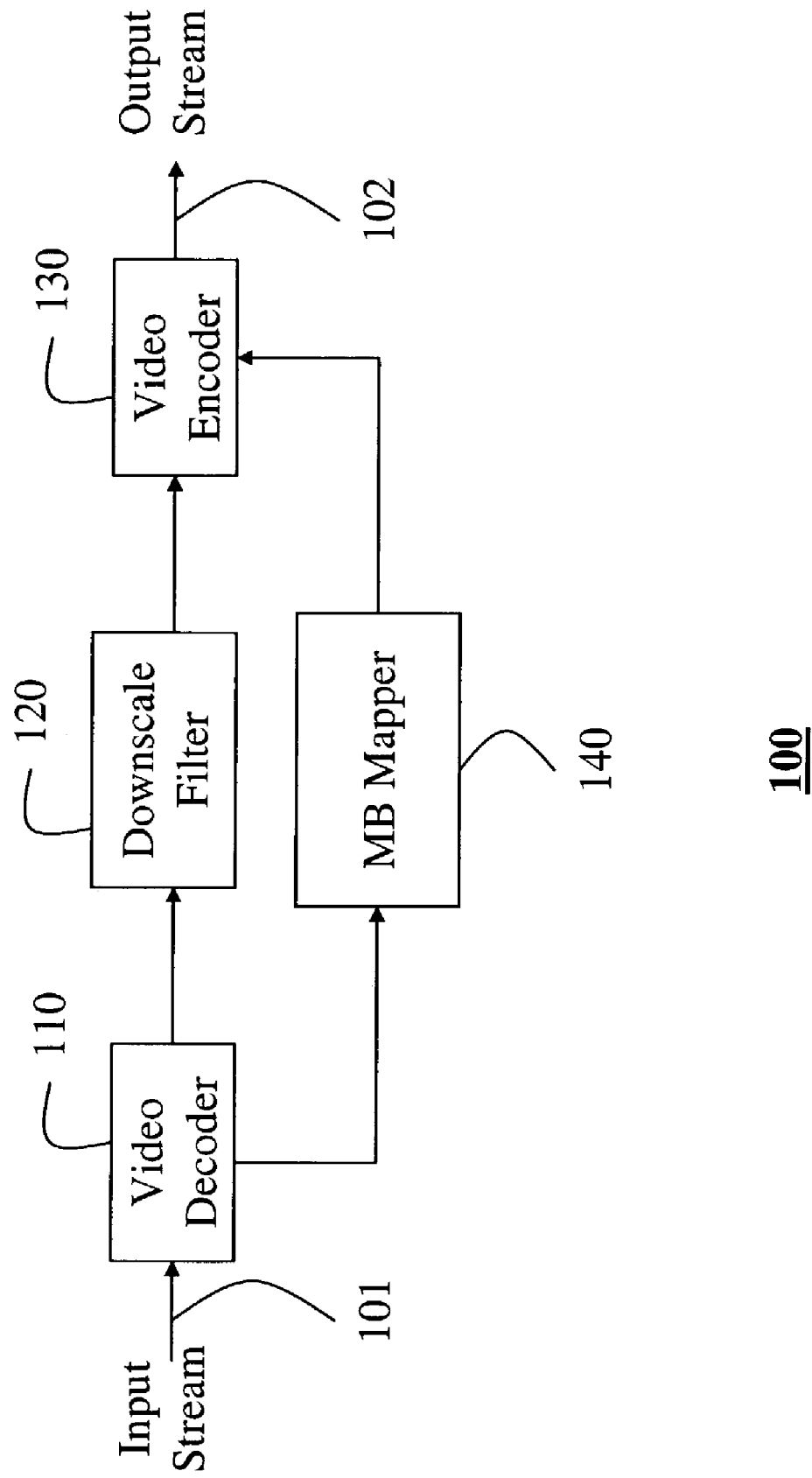
FIG. 1 is a block diagram of a prior art transcoding system.
Figure 2:
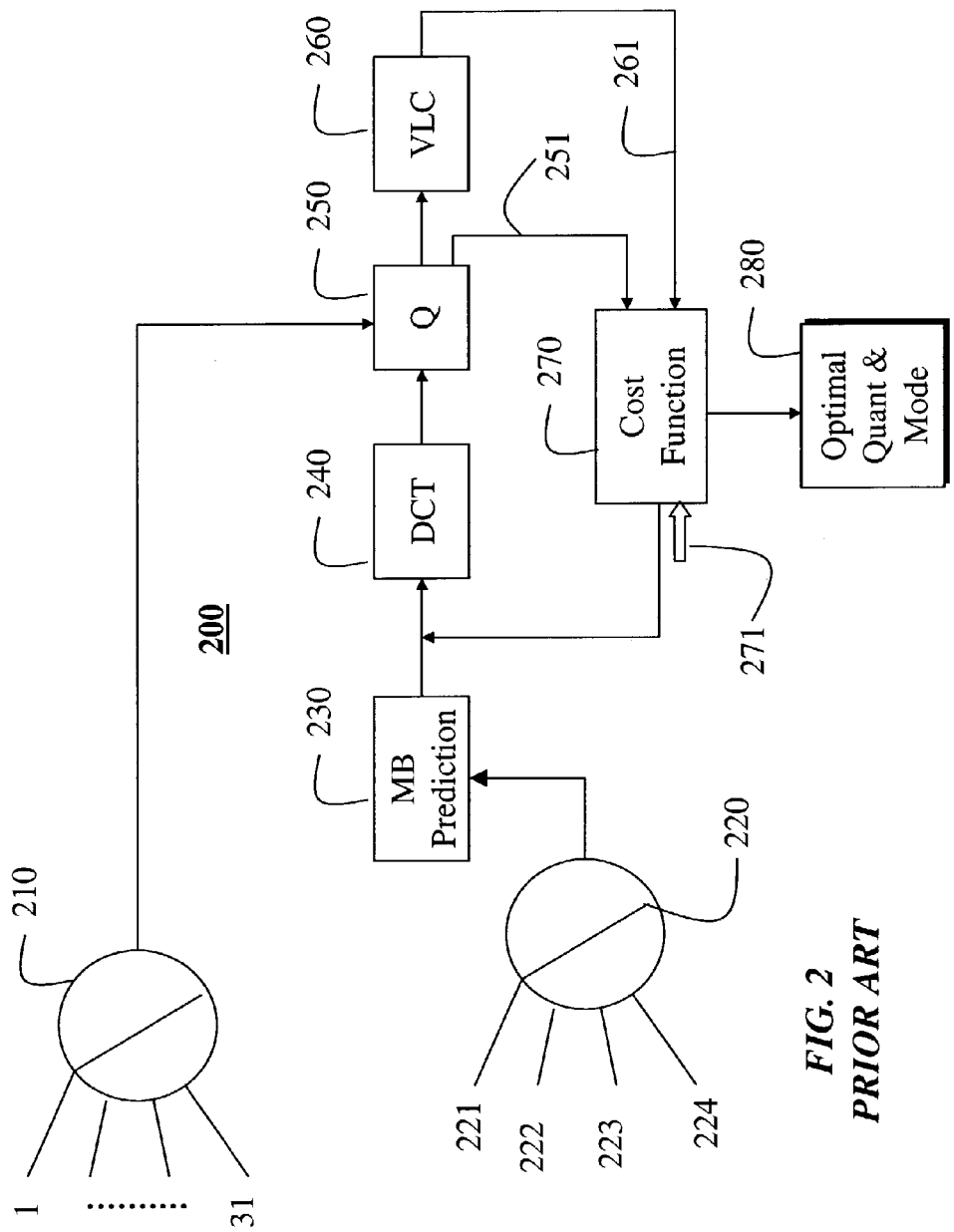
FIG. 2 is a flow chart of a prior art method for joint mode and quantizer selection based on rate and distortion values.
Figure 3:
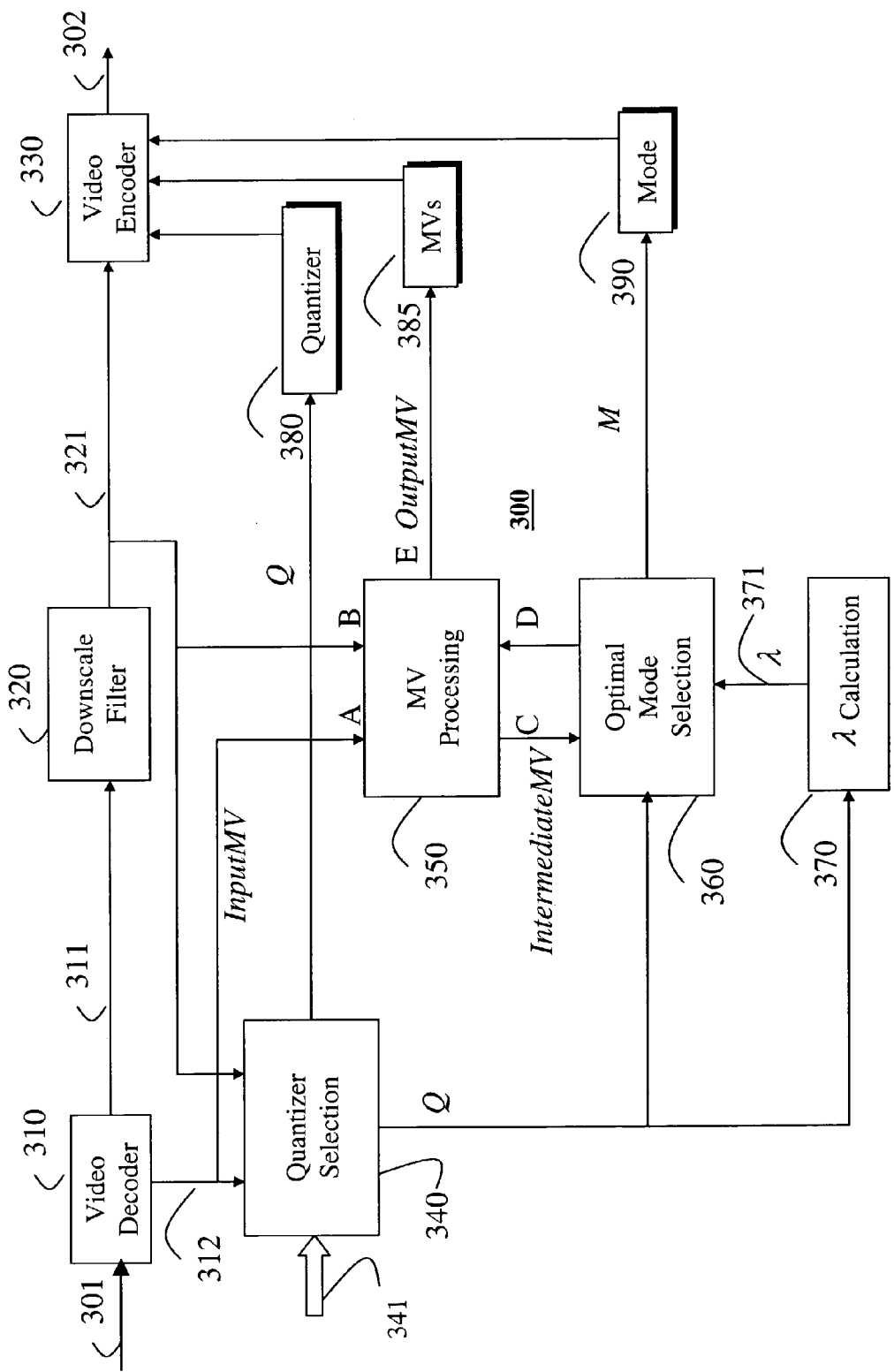
FIG. 3 is a block diagram of video transcoding system with quantization selection, coding mode optimization and motion vector formation according to the invention.

As shown in FIG. 3, the present invention provides a system and method 300 for transcoding compressed video streams from a high bit rate and a high resolution to a low bit rate and a low resolution. In contrast with prior art, the system and method according to the invention determines a quantization scale, a motion vector decision, and a mode decision in a cascaded manner to provide an optimal transcoding with lower complexity.

System Structure

The system 300 includes a video decoder 310, a downscale filter 320, and a video encoder 330 connected serially. The video decoder and the downscale filter provide input to a quantizer selector 340 and a motion vector (MV) processor 350. Mode selection 360 is based on determining 370 a multiplier value $\lambda$ 371. In addition, the system includes a quantizer 380, motion vectors (MVs) 385, and modes 390 for the encoder 330. The letters A–E refer to input and output signals used by the MV processor 350, where A are input motion vectors, B are downscaled pictures, C are intermediate motion vectors, D are macroblock modes, and E are output motion vectors.

System Operation

An input compressed video stream 301 is received into the video decoder 310 for bitstream syntax decoding. The input video stream can be a progressive or interlaced video. With progressive video, each frame in the video sequence is raster scanned. Interlaced video has two fields per frame, which are referred to as the odd field and the even field. The odd field is scanned before the even field.

The decoding produces reconstructed pictures 311. A picture is defined to be a set of macroblocks. Depending on the input signal, the macroblocks can be a group of pixels in a frame or field. To be more specific, we can refer to a picture as a frame-picture or field-picture.

The reconstructed pictures 311 are represented in a Y, U, V format. The decoder also produces macroblock information 312. The macroblock information includes quantizer step sizes, macroblock coding modes and input motion vectors A.

Each YUV picture is downscaled 320, using sub-sampling, to a downscaled YUV picture 321 to meet a reduced spatial resolution requirement.

The macroblock information 311 from the video decoder 310 and the downscaled YUV pictures 312 are received into the quantizer selector 340 and the MV processor 350. The downscaled pictures are then encoded 330 into the output compressed video stream 302 according to the quantizer Q, MVs 385, and a selected mode M.

Because the quantizer selection 340 and mode selection 360 are performed in separate modules, the coding mode 390 can be determined after the quantizer 380 has been selected. In other words, the mode selection 360 is only for a single quantizer, and not all possible quantizers, as in the prior art. As before, if we use Q to denote the set of all admissible quantizers, M to denote the set of all admissible coding modes, then the complexity of the system according to the invention is only Q+M, rather than Q×M as in the prior art. If Q>1 and M>1, then Q+M≦Q×M. As the values Q and M increase, the complexity of the system according to the invention increases at a much lower rate than the complexity of the prior art system.

Furthermore, the system 300 has greater flexibility than the prior art system. The quantizer selection 340 can be achieved by any means, therefore the quantizer selector can be replaced by another similar module without affecting the overall operation of the system. In addition to quantizer selection and mode selection, various configurations of motion vector processing 350 are possible to greatly enhance the flexibilities of the video transcoding system and method 300 according to the invention.

Quantizer Selection

Quantizer selection 340 can be achieved by any known means. For example, the well-known TM5 quantizer selection can be used, or any other optimal quantizer selection process can be used. The main point is that the quantizer selection process can be made separable from the mode decision to lower the complexity, while achieving a high quality.

Given a quantization parameter set $q_i \in \{1, \ldots, 31\}$, $\forall i=1, \ldots N$, where N is a macroblock number of each picture, a minimum distortion D is subject to a bit rate constraint R341, $$\min D \text{ subject to } R < R_{picture}, \quad (1)$$

with the total distortion D and the total number of bits R given by $$D = \sum_{i=1}^{N} d_i(q_i) \quad R = \sum_{i=1}^{N} r_i(q_i). \quad (2)$$

For a particular value $\chi$, if a set of $q_i^*(\chi)$ minimizes the following expression:

$$\min_{q_i} \{d_i(q_i) + \chi r_i(q_i)\} \forall\, i = 1, \ldots, N, \quad (3)$$

then the set of $q_i^*(\chi)$ corresponds to an optimal solution to equation (1).

To determine an optimal operating point on the R-D curve, an optimal slope, $\chi^*$, is searched in equation (3), such that, $R(\chi^*)<R_{picture}$. The invention uses a fast convex search process.

Step-1:
Initialize two values $\chi_1$ and $\chi_2$ of $\chi$, with $\chi_1<\chi_2$ satisfying a relation:

$$\sum_{i=1}^{N} R_i(\chi_1) < R_{picture} < \sum_{i=1}^{N} R_i(\chi_2).$$

Step-2:

$$\chi_{next} = \frac{\chi_1 + \chi_2}{2}.$$

Step-3:
Substitute $\chi_1$ and $\chi_{next}$ into Equation (3), minimize the expression and derive $q_i^*(\chi_1)$ and $q_i^*(\chi_{next})$, $\forall i=1, \ldots N$, respectively.

Step-4:
If $[R(\chi_1)-R_{picture}][R(\chi_{next})-R_{picture}]<0$, then replace $\chi_2$ by $\chi_{next}$, otherwise, replace $\chi_1$ by $\chi_{next}$.

Step-5:
If $$\left| \frac{R(\chi_{next}) - R_{picture}}{R_{picture}} \right| < \varepsilon,$$

where $\varepsilon$ is a predetermined small positive number, then the optimal slope is $\chi^*$, and $q_i^*$ $\forall i=1, \ldots N$ is the optimal quantizer step size for each macroblock; else, go to Step-2.

Motion Vector Processing

Figure 4A:
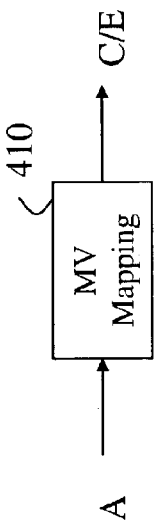
FIGS. 4A–4C are flow charts of methods for processing motion vectors.
Figure 4B:
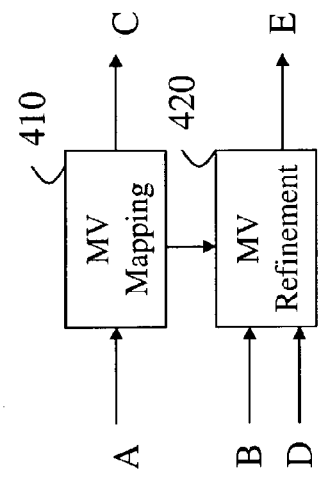
Figure 4C:
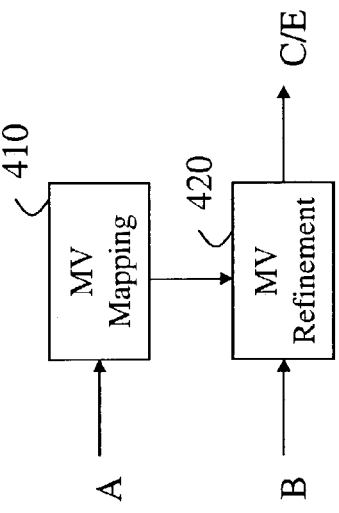

As shown in FIGS. 4A–4C, the motion vector (MV) processor 350 according to the present invention can have three configurations including MV mapping blocks 410 and MV refinement blocks 420. The configurations differ in the required computational complexity and quality is achieved. In the following, we refer to a set of MVs, where the set can include any number of MV's associated with a macroblock, e.g., 1 MV, 4 MV's, etc.

In FIG. 4A, the MV processor 350 receives only the input MVs A from the decoder. The MV mapping 410 is performed, and the resulting set of intermediate or output MVs C/E is recorded. The MVs are used by the mode selection module, and is also sent to the encoder 330. The MV mapping 410 can be done in various ways using any prior art method. This is the lowest complexity configuration compared to the configurations described below.

In FIG. 4B, the MV mapping 410 is first performed based on the received motion information as above. The resulting set of intermediate MVs C is output to the mode selection module. The mode selection module then calculates each mode based on the resulting set of MVs and sends the selected mode back to the MV processing module to refine 420 the set of MVs for the selected mode. To refine the set of MVs, the downscaled pictures B are used. The final set of MVs is then sent to the encoder 330.

In FIG. 4C, both the input motion vectors A and downscaled pictures B are received into the MV processing module. As before, the MV mapping 410 is first performed. Directly following the mapping, the MV refinement 420, with a small search window around the resulting motion vector, is performed. As for FIG. 4B, to refine the set of MVs, the downscaled pictures are used. The refined and final sets of MVs C/E are used for the mode selection module and are also sent to the encoder.

The key difference between the configurations of FIGS. 4B and 4C is that the selected mode is known in the first case when the MV refinement is done. Therefore some savings on computation is achieved because the MVs associated with the modes that have not selected do not need to be estimated or refined.

Optimal Mode Selection

The resulting quantization scale (Q) and motion vector (MV) for each macroblock are received into the optimal mode selection module 360. Based on the optimized quantization scales, a Lagrangian rate-distortion process selects the coding mode M for each macroblock according to a cost function:

$$J_i(\lambda, M_k \mid q_i) = \min_{M_k} \{D_i(M_k \mid q_i) + \lambda R_i(M_k \mid q_i)\}. \quad (4)$$

A multiplier $\lambda$ for the Lagrangian rate distortion function $R(,)$ is obtained by setting its derivative to zero, i.e., $$\frac{\partial J}{\partial R} = \frac{\partial D}{\partial R} + \lambda = 0, \quad (5)$$

which yields $$\lambda = -\frac{\partial D}{\partial R}. \quad (6)$$

Figure 5:
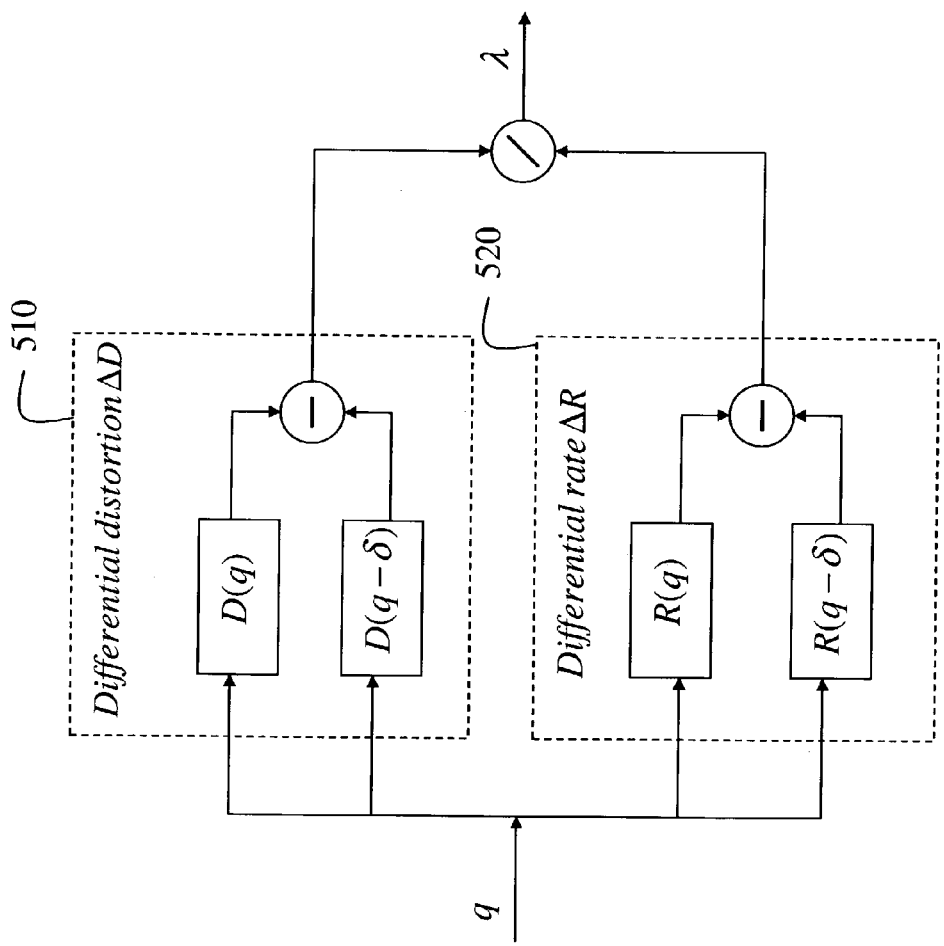
FIG. 5 is a block diagram of a process for determining a multiplier $\lambda$ used for optimal mode selection according to the invention.

As shown in FIG. 5, the value for the multiplier $\lambda$ can be obtained by the following approximation:

$$\lambda = -\frac{\partial D}{\partial R} \approx -\frac{\Delta D}{\Delta R} = -\frac{D(q) - D(q-\delta)}{R(q-\delta) - R(q)}, \quad (7)$$

because the quantizer $q_i$ and motion vector MV are known for each macroblock. The process uses a differential distortion ΔD block 510, and a differential rate ΔR block 520.

For each candidate mode, the cost function (4) is evaluated, and the resulting multiplier λ that minimizes the cost is used to select the transcoding mode for the macroblock. Because the multiplier λ is obtained without iteration, the complexity of finding the optimal coding mode is greatly reduced.

After determining the quantization scale, the optimal coding mode and the motion vector for the macroblock, the encoder 330 codes the quantized macroblock with the optimal quantization scale, the selected encoding mode M 390 and the motion vectors 385 to generate the transcoded bit steam 302.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for transcoding an input video to a lower spatial resolution, comprising the steps of:
   decoding the input video into pictures, each picture including a set of macroblocks;
   filtering each picture to a downscaled picture having a lower spatial resolution;
   selecting a quantization scale for each macroblock in the downscaled picture;
   generating a set of motion vectors for each macroblock in the downscaled picture;
   determining a multiplier value based on the quantization scale for each macroblock in the downscaled picture;
   selecting one of a plurality of encoding modes for each macroblock in the downscaled picture according to the quantization scale, the motion vectors, and the multiplier value;
   evaluating a cost function to determine the selected encoding mode for each macroblock in each downscaled picture, and wherein the cost function is $$J_i(\lambda, M_k | q_i) = \min_{M_k} \{D_i(M_k | q_i) + \lambda R_i(M_k | q_i)\},$$

where λ is a multiplier, M is the selected mode, q is the quantizer scale, D is a distortion, and R is a bit rate; and
   encoding the each macroblock in each downscaled picture according to the quantization scale, the selected encoding mode, and the set of motion vectors to produce an output video having a lower spatial resolution that the input video.

2. The method of claim 1 wherein the video is a progressive video, and the picture is a frame-picture.

3. The method of claim 1 wherein the video is an interlaced video, and the picture is a field-picture.

4. The method of claim 1 wherein the decoding produces quantizer step sizes for selecting the quantization scale, the encoding mode, and motion vectors.

5. The method of claim 1 wherein each macroblock of each picture includes input motion vectors, and the generating further comprises:
   mapping the input motion vectors to produce the motion vectors for the selecting and encoding.

6. The method of claim 1 wherein each macroblock of each picture includes input motion vectors, and the generating further comprises:
   mapping the input motion vectors to intermediate motion vectors for the selecting;
   refining the intermediate motion vectors based on the downscaled picture and the selected mode to produce the motion vectors for the encoding.

7. The method of claim 1 wherein each macroblock of each picture includes input motion vectors, and the generating further comprises:
   mapping the input motion vectors to intermediate motion vectors;
   refining the intermediate motion vectors based on the downscaled picture to produce the motion vectors for the selecting and encoding.

8. The method of claim 1 further comprising:
   minimizing a rate-distortion curve to determine the quantization scale.

9. The method of claim 1 wherein the multiplier λ for the rate function R(.) is obtained by setting a derivative of the rate function to zero according to $$\frac{\partial J}{\partial R} = \frac{\partial D}{\partial R} + \lambda = 0, \text{ to obtain } \lambda = -\frac{\partial D}{\partial R}.$$

10. The method of claim 9 wherein the derivative is approximated by $$\lambda = -\frac{\partial D}{\partial R} \approx -\frac{\Delta D}{\Delta R} = \frac{D(q) - D(q - \delta)}{R(q - \delta) - R(q)}.$$

11. A system for transcoding an input video to a lower spatial resolution, comprising the steps of:
   means for decoding the input video into pictures, each picture includes a set of macroblocks;
   means for filtering each picture to a downscaled picture having a lower spatial resolution;
   means for selecting a quantization scale for each macroblock in the downscaled picture;
   means for generating a set of motion vectors for each macroblock in the downscaled picture;
   means for determining a multiplier value based on the quantization scale for each macroblock in the downscaled picture;
   means for selecting one of a plurality of encoding modes for each macroblock in the downscaled picture according to the quantization scale, the motion vectors, and the multiplier value, in which a cost function is evaluated to determine the selected encoding mode for each macroblock in each downscaled picture, and wherein the cost function is $$J_i(\lambda, M_k | q_i) = \min_{M_k} \{D_i(M_k | q_i) + \lambda R_i(M_k | q_i)\},$$

where λ is a multiplier, M is the selected mode, q is the quantizer scale, D is a distortion, and R is a bit rate; and
   means for encoding the each macroblock in each downscaled picture according to the quantization scale, the selected encoding mode, and the set of motion vectors.

* * * * *